(12) United States Patent
Hill

(10) Patent No.: US 6,458,053 B1
(45) Date of Patent: Oct. 1, 2002

(54) PASSIVE LUBRICATION COLLECTOR AND MANAGER IN A MOTORIZED CONVEYOR PULLEY

(75) Inventor: Jason J. Hill, Manchester, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/665,382

(22) Filed: Sep. 20, 2000

(51) Int. Cl.[7] .............................................. F16H 57/04
(52) U.S. Cl. ........................................................ 474/91
(58) Field of Search ........................ 474/166, 184–193, 474/91, 92; 184/16, 19, 102; 198/500, 788, 835

(56) References Cited

U.S. PATENT DOCUMENTS

| | | | | |
|---|---|---|---|---|
| 405,835 A | * | 6/1889 | Gracey | 184/19 |
| 1,971,781 A | * | 8/1934 | Henderson et al. | 184/11.1 |
| 2,676,671 A | * | 4/1954 | Schmitter | 184/11.1 |
| 2,997,608 A | * | 8/1961 | Musser | 310/67 |
| 4,057,126 A | * | 11/1977 | Stephens | 184/11 R |
| 5,088,596 A | * | 2/1992 | Agnoff | 198/788 |
| 5,413,209 A | * | 5/1995 | Werner | 198/500 |

* cited by examiner

Primary Examiner—David A. Bucci
Assistant Examiner—Vicky A. Johnson
(74) Attorney, Agent, or Firm—Harness, Dickey & Pierce, P.L.C.

(57) ABSTRACT

A motorized conveyor pulley comprises a cylindrical pulley drum with axially opposite end plates enclosing an electric motor and a drive transmission within the drum. The end plates of the pulley are mounted on a pair of shaft ends that pass through the end plates at the axially opposite ends of the pulley and support the motor and drive transmission in the pulley as well as supporting the pulley drum housing for rotation. As well as the motor and transmission, the pulley drum housing also contains an amount of lubricant that lubricates the bearings and gears of the drive transmission and cools the motor. A passive lubrication collector and manager is mounted in the pulley drum housing and wipes lubricant from the interior surface of the pulley drum housing and then directs the wiped lubricant to the bearings and gears of the drive transmission. The passive lubrication collector and manager is also used in combination with journal collars that support the journal ends of shafts of the drive transmission where the journal collars have openings that are fed with lubricant by the lubrication collector and manager, enabling use of the less expensive sleeve bearings. The cover also shields the motor wiring from the lubricant preventing the lubricant from leaking from the conveyor pulley along the wiring.

28 Claims, 6 Drawing Sheets

PASSIVE LUBRICATION COLLECTOR AND MANAGER IN A MOTORIZED CONVEYOR PULLEY

BACKGROUND OF THE INVENTION (1) Field of the Invention

The present invention pertains to a motorized conveyor pulley of the type comprising a cylindrical pulley drum with axially opposite end plates enclosing an electric motor and a drive transmission within the drum. The end plates of the pulley are mounted on a pair of shaft ends that pass through the end plates at the axially opposite ends of the pulley and support the motor and drive transmission in the pulley as well as supporting the pulley drum housing for rotation. As well as the motor and transmission, the pulley drum housing also contains an amount of lubricant that lubricates the bearings and gears of the drive transmission and cools the motor. In particular, the present invention pertains to a passive lubrication collector and manager that is mounted in the pulley drum housing and wipes lubricant from the interior surface of the pulley drum housing and then directs the wiped lubricant to the bearings and gears of the drive transmission. The passive lubrication collector and manager enables using a smaller amount of lubricant contained in the pulley drum housing than prior art pulley drums and also enables the use of less expensive sleeve bearings instead of ball and/or roller bearings employed in the prior art conveyor pulleys, thereby significantly decreasing the costs of manufacturing the conveyor pulley. The passive lubrication collector and manager is also used in combination with journal collars that support the journal ends of shafts of the drive transmission where the journal collars have openings that are fed with lubricant by the lubrication collector and manager, enabling use of the less expensive sleeve bearings instead of ball and/or roller bearings.

(2) Description of the Related Art

The motorized conveyor pulley of the type of which the present invention is an improvement is employed at one end of a flat, continuous belt conveyor where the belt of the conveyor is looped or wrapped over the pulley drum housing of the motorized conveyor pulley at one end of the conveyor and is wrapped over an idler pulley at an opposite end of the conveyor. In order to provide sufficient friction engagement between the pair of pulleys and the belt to avoid slipping of the belt on the pulleys when the belt is conveying a substantial load, the belt is usually stretched very tight between the pair of pulleys resulting in a substantial load exerted on the pulleys by the belt.

The load exerted by the belt on the motorized conveyor pulley is transferred to the component parts contained inside the pulley. The typical motorized conveyor pulley includes a cylindrical pulley drum housing having a hollow interior. A pair of circular end plates close off the axially opposite ends of the drum housing. The end plates have coaxial center bores and stationary stub shafts extend through the center bores. Each stub shaft has a bearing and seal mounted on its exterior that is received in the center bore of one of the end plates, thereby mounting the pulley drum for rotation on the stationary stub shafts.

Contained inside the pulley drum is an electric motor and a drive transmission. The electric motor and a gear carrier of the drive transmission are mounted stationary to the ends of the two stub shafts projecting into the interior of the pulley drum housing. The electric wiring of the motor typically passes through a hole in one of the end shields of the motor and then through a hole in the gear carrier into the gear carrier interior. The wiring then passes through a center bore of the shaft on which the gear carrier is mounted to the exterior of the conveyor pulley. The electric motor drives the gear transmission mounted on the gear carrier that in turn drives a ring gear mounted to the interior surface of the pulley drum housing, thereby rotating the pulley. The journal ends of the shafts of the gear transmission are typically mounted in ball bearings or roller bearings due to the substantial loads exerted on the shaft ends.

The pulley drum contains a bath of lubricant, usually an expensive synthetic lubricant, that at times fills half the interior volume of the pulley drum housing. The lubricant both cools and lubricates the motor, the transmission gearing and the bearings finding its way into the spaces between the balls and rollers of the bearings. It is necessary that the pulley drum housing contain a substantial amount of lubricant in order to reach all of the gears and bearings of the drive transmission. The large amount of lubricant is needed because when the conveyor pulley is operated, usually at 100 rpm, the rotation of the pulley drum housing will cause a large portion of the lubricant to collect around the inner surface of the pulley drum housing due to the centrifugal force exerted on the lubricant by the rotation of the conveyor pulley. This decreases the level of the portion of lubricant accumulated at the bottom of the interior of the pulley drum housing. Therefore, to ensure that the lubricant reaches the gears and bearings of the drive transmission as the conveyor pulley is operated, a substantial amount of lubricant is contained in the pulley drum housing.

The substantial amount of lubricant contained in the pulley drum housing contributes significantly to the overall cost of the pulley conveyor. Depending on the size of the pulley conveyor, at times the amount of the synthetic lubricant contained inside the pulley conveyor is the most expensive component part of the pulley conveyor construction. In addition, because a substantial amount of lubricant must be contained in the pulley drum housing, there is an increased opportunity for the lubricant to leak from the pulley drum housing along the electric lead lines of the motor as they pass from the motor, through the gear carrier and one of the stub shafts of the conveyor pulley.

The construction of the typical conveyor pulley could be improved by reducing the amount of lubricant required to be contained in the pulley drum housing and thereby reducing its costs and likelihood of leaking from the pulley drum housing while still ensuring that adequate amounts of lubricant are supplied to the bearings and the gears of the drive transmission.

SUMMARY OF THE INVENTION

The motorized conveyor pulley of the invention overcomes the disadvantages associated with prior art conveyor pulleys by providing the conveyor pulley with a passive lubrication collector and manager that enables a significant reduction in the amount of synthetic lubricant employed in the conveyor pulley drum housing. In addition, through use of the lubrication collector and manager the ball and roller bearings that support the shafts of the drive transmission may be replaced with less expensive sleeve bearings due to the construction of the collector and manager and due to novel collars of the conveyor pulley drive transmission that support the sleeve bearings and the shaft journal ends. By reducing the amount of synthetic lubricant required by the motorized conveyor pulley and replacing the roller bearings and ball bearings of the drive transmission with sleeve bearings, the cost of the motorized conveyor pulley of the present invention is substantially reduced.

The passive lubrication collector and manager of the invention is basically a cover that is mounted inside the conveyor pulley drum over the electrical wiring exiting the motor as well as the drive transmission. By projecting over the wiring of the electric motor, the cover directs splashing lubricant away from the wiring and reduces the likelihood of lubricant splashing onto the wiring as the conveyor pulley is operated and then potentially leaking along the wiring out of the conveyor pulley. A wiper is mounted on the cover and projects upwardly from the cover and engages in sliding engagement with the interior surface of the conveyor pulley drum housing. The wiper wipes lubricant from the interior surface of the conveyor pulley drum housing as the conveyor pulley is operated and directs the lubricant downwardly onto the top surface of the cover. The cover has a crest at its middle and lower edges with gutters on opposite sides of the crest. The crested cover directs lubricant downwardly toward the gutters where the lubricant is collected. The gutters communicate with lubricant guides that direct portions of the lubricant gravitating downwardly along the guides to the bearings and the gears of the drive transmission. In addition, collars mounting the journal ends of the drive shafts of the drive transmission in the motor end shield and on the gear carrier have openings providing access to the journal ends of the shafts in the collars. The lubricant guides direct gravitating lubricant to the openings of the collars, thereby ensuring an adequate supply of lubricant to the journal ends of the shafts. This direct supply of lubricant to the journal ends of the shafts enables the ball bearings and roller bearings of the prior art conveyor pulley to be replaced with less expensive sleeve bearings. Thus, the passive lubricant collector and manager and the redesigned bearing collars of the conveyor pulley of the invention reduce the manufacturing costs of a conveyor pulley over that of prior art conveyor pulleys by enabling the amount of synthetic lubricant employed in the conveyor pulley to be significantly reduced and by enabling the use of less expensive sleeve bearings for the drive transmission shafts than the ball and roller bearings of the prior art.

BRIEF DESCRIPTION OF THE DRAWINGS

Further features of the invention are revealed in the following detailed description of the preferred embodiment of the invention and in the drawing figures wherein.

DETAILED DESCRIPTION OF THE PREFERRED EMBODIMENT

Figure 1:
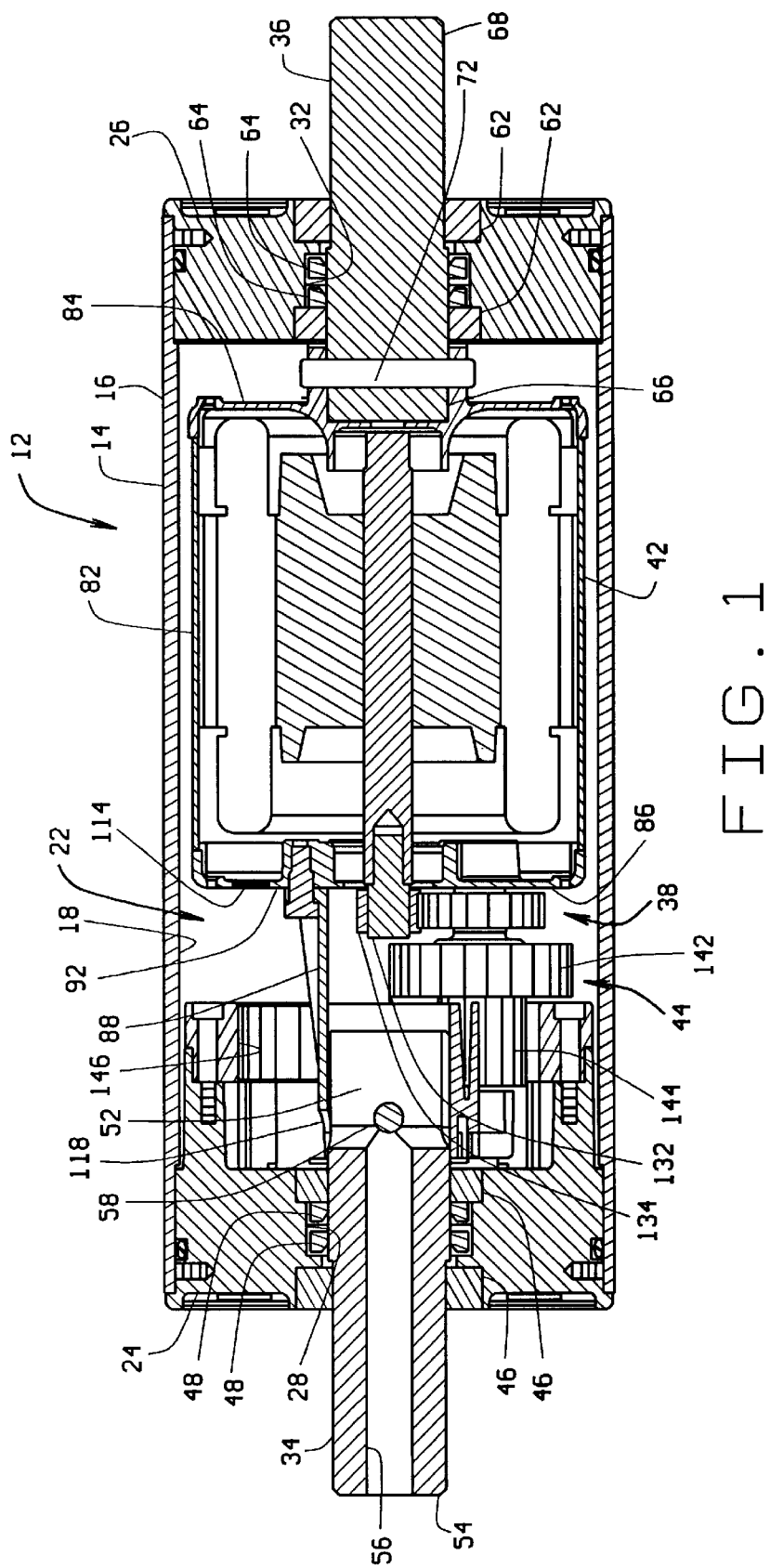
FIG. 1 is a sectioned elevation view of a motorized conveyor pulley of the type with which the passive lubricant collector and manager and bearing collars of the invention are employed.

FIG. 1 shows the motorized conveyor pulley 12 of the present invention. The motorized conveyor pulley 12 is of the type disclosed in copending U.S. patent application Ser. No. 09/477,952, filed on Jan. 5, 2000, incorporated herein by reference. To simplify FIG. 1, the passive lubrication collector and manager and the modified bearing collars of the invention are not shown in the drawing figure. The motorized conveyor pulley 12 shown in FIG. 1 is similar to prior art motorized conveyor pulley constructions in that it is basically comprised of a cylindrical pulley drum housing 14 having an exterior surface 16, an interior surface 18 and a hollow interior volume 22. A first circular end plate 24 and a second circular end plate 26 are secured in the openings at the axially opposite ends of the pulley drum housing 14. The first and second end plates 24, 26 have respective first 28 and second 32 interior bores and first 34 and second 36 stub shafts extend through the respective first and second interior bores. A motive source 38 of the motorized conveyor pulley 12 is contained in the pulley drum housing 14 and is connected between ends of the first 34 and second 36 stub shafts. In the preferred embodiment of the invention, the motive source 38 is comprised of an electric motor 42 and a gear transmission 44.

The first and second stub shafts 34, 36 are similar to those employed in prior art motorized conveyor pulleys. The first stub shaft 34 is mounted in the interior bore 28 of the first end plate 24 by bearings 46 and lip seals 48. The shaft has an interior end 52 within the conveyor pulley drum housing 14 and an opposite exterior end 54. A hollow bore 56 passes through the center of the shaft and is employed in routing the electrical wiring (not shown) from the electric motor 42 to the exterior of the conveyor pulley. A pin 58 passes through the shaft adjacent its interior end 52 and secures the shaft to a gear carrier of the invention yet to be described. The second stub shaft 36 is mounted in the interior bore 32 of the second end plate 26 by bearings 62 and lip seals 64. The second shaft 36 is solid and has an interior end 66 within the pulley drum housing 14 and an exterior end 68 outside of the pulley drum housing. A pin 72 secures the second shaft adjacent its interior end 66 to the electric motor 42 of the motive source. In the operative environment of the motorized conveyor pulley 12 both the first shaft 34 and the second shaft 36 are fixed stationary to a support structure of the conveyor system (not shown) in which the motorized conveyor pulley is employed.

As stated above, a pin 72 secures the interior end 66 of the second shaft 36 to the electric motor 42 of the conveyor pulley. The electric motor 42 shown in FIG. 1 is only one example of the type of motor which may be used with the conveyor pulley. The motor is enclosed in a housing shell 82 with an end shield 84 at its right hand end as shown in FIG. 1 secured to the second stub shaft 36 by the pin 72. The motor also has another end shield 86 at its opposite left hand end as shown in FIG. 1 that has been modified for the lubrication collector and manager of the invention to be described. The modified end shield 86 of the invention is connected to the interior end 52 of the first stub shaft 34 by the gear carrier 88 of the invention that is in turn connected to the stub shaft by a pin 58.

Figure 2:
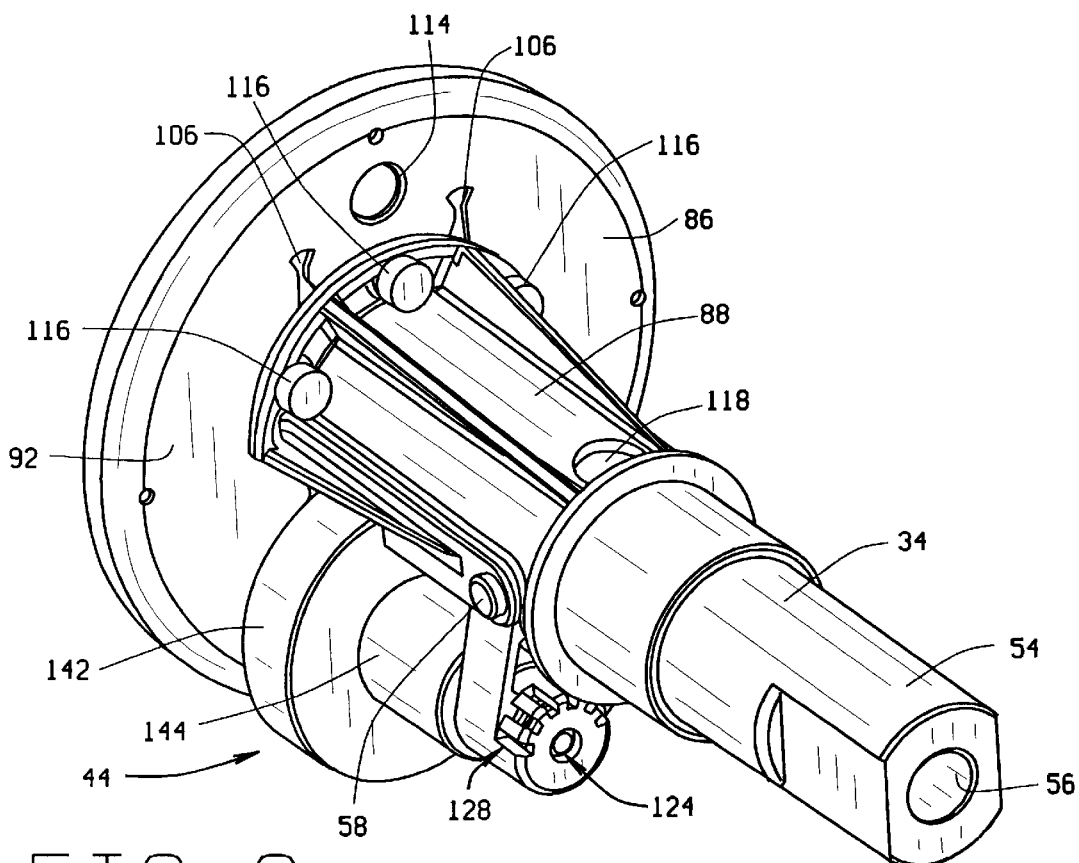
FIG. 2 is a perspective view of a modified motor end shield of the invention with the gear carrier attached.
Figure 3:
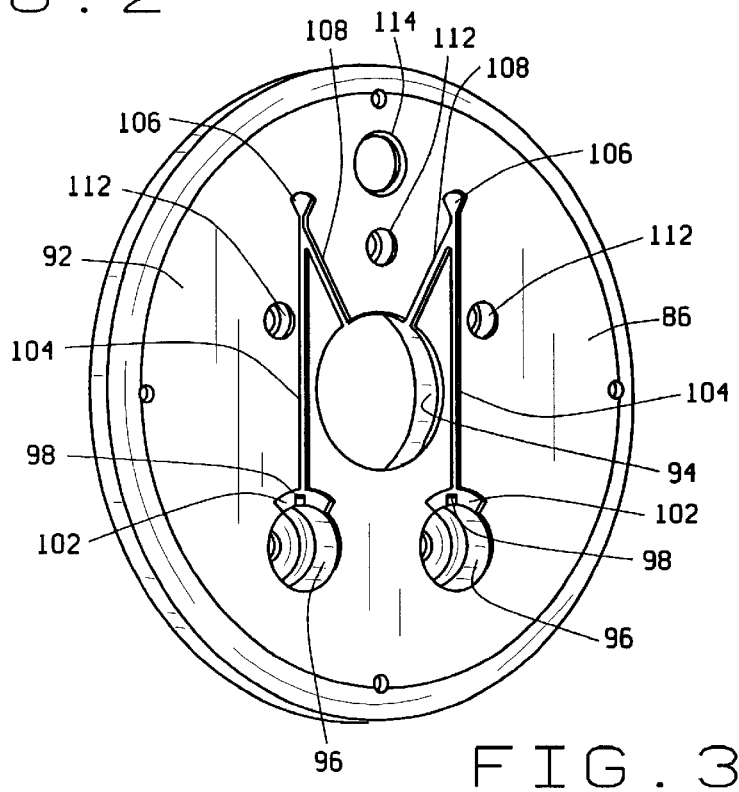
FIG. 3 is a perspective view of the modified motor end shield of the invention separated from the motorized conveyor pulley.

FIG. 2 shows the modified end shield 86 and the gear carrier 88 of the invention removed from the conveyor pulley housing for clarity. FIG. 3 shows the modified end shield 86 disassembled from the conveyor pulley. The view of the modified end shield 86 in FIG. 3 is that of its exterior surface 92, or the surface outside of the motor enclosure. The end shield 86 is provided with a center, motor shaft hole 94 and a pair of drive transmission stationary shaft collars formed as cavities or collar openings 96 in the end shield. The center shaft hole 94 is dimensioned to receive a motor shaft bearing (not shown) therein that in turn supports the drive shaft of the motor for rotation. The shaft cavities 96 are recessed into the end shield 86 and are dimensioned to receive sleeve bearings (not shown) that support one journal end of a pair of gear shafts employed in the drive transmission of the conveyor pulley. Although two cavities 96 are shown for supporting two gear shafts, other gear transmissions could be employed that comprise only one gear shaft, thus eliminating the need for one of the shaft cavities. Each of the shaft cavities 96 have lubricant ingress holes 98 that extend into the end shield 86 along the tops of the cavities 96 to the same depth into the end shield as the shaft cavities. Communicating with the lubricant ingress holes 98 are arcuate troughs 102 that extend across the tops of each of the cavities 96 and are recessed slightly into the end shield 86. A pair of outer lubricant guides 104 are formed as slots in the end shield 86 and extend upwardly from the troughs 102 to a pair of lubricant funnel recesses 106 also formed into the end shield 86. A pair of inner lubricant guides 108 are also formed as slots in the end shield 86 and extend from the pair of funnel recesses 106 and angle toward the drive shaft hole 94 intersecting the shaft hole. With the arrangement of the guides 104, 108 on the modified end shield 86 shown in FIG. 3, lubricant directed to the pair of funnel recesses 106 will gravitate down the inner lubricant guide slots 108 and the outer lubricant guide slots 104 to the shaft hole 94 and the shaft cavities 96, respectively. The lubricant directed to the shaft cavities 96 will pass along the lubricant ingress holes 98 at the tops of the cavities supplying lubricant to the sleeve bearings (not shown) inserted into the cavities that support the journal ends of the gear transmission shafts. In this way, the bearing in the end shield shaft hole 94 supporting the motor drive shaft and the bearings in the end shield shaft cavities 96 supporting the drive transmission shafts are assured of receiving lubrication. The modified end shield 86 is also provided with three fastener holes 112 and a wiring exit hole 114 through which the electric wiring of the motor passes.

FIG. 2 shows the gear carrier 88 of the invention secured to the modified end shield 86 by three fasteners 116 screw threaded into the fastener holes 112 of the end shield. It can be seen in FIG. 2 that the gear carrier 88 attached to the end shield 86 leaves the funnel recesses 106 exposed. This enables lubricant supplied to the funnel recesses 106 to pass between the gear carrier 88 and the end shield 86 through the two pairs of guide slots 104, 108. The gear carrier 88 is also shown secured to the first stub shaft 34 by the pin 58. The gear carrier 88 has a wiring hole 118 in the top of the carrier. The wiring of the electric motor exits the wiring hole 114 in the modified end shield 86 and enters the wiring hole 118 of the gear carrier 88 and is then passed through the center bore 56 of the first stub shaft 34 and exits the conveyor pulley.

Like the modified end shield, the gear carrier 88 is also provided with a pair of shaft collars having recessed cavities 122, 124 for supporting journal ends of the drive transmission shafts. The pair of carrier shaft collar cavities 122, 124 can best be seen in FIG. 2 and FIGS. 8 through 10. Each of the carrier shaft collar cavities 122, 124 is formed as a cylindrical cup with an opening (not shown) that opposes one of the shaft collar cavities 96 of the modified end shield 86. Each of the carrier shaft cavities 122, 124 like the end shield shaft cavities 96, is dimensioned to receive a sleeve bearing and a journal end of the drive transmission shafts therein. The carrier shaft cavities 122, 124 are also provided with a plurality of openings 126, 128 spacially arranged across the tops of the cavities. The openings 126, 128 extend through to the shaft cavities and provide ingress of lubricant from outside of the carrier shaft cavities 122, 124 to the inside of the carrier shaft cavities and to the sleeve bearings and shaft journal ends mounted in the shaft cavities.

Figure 7:
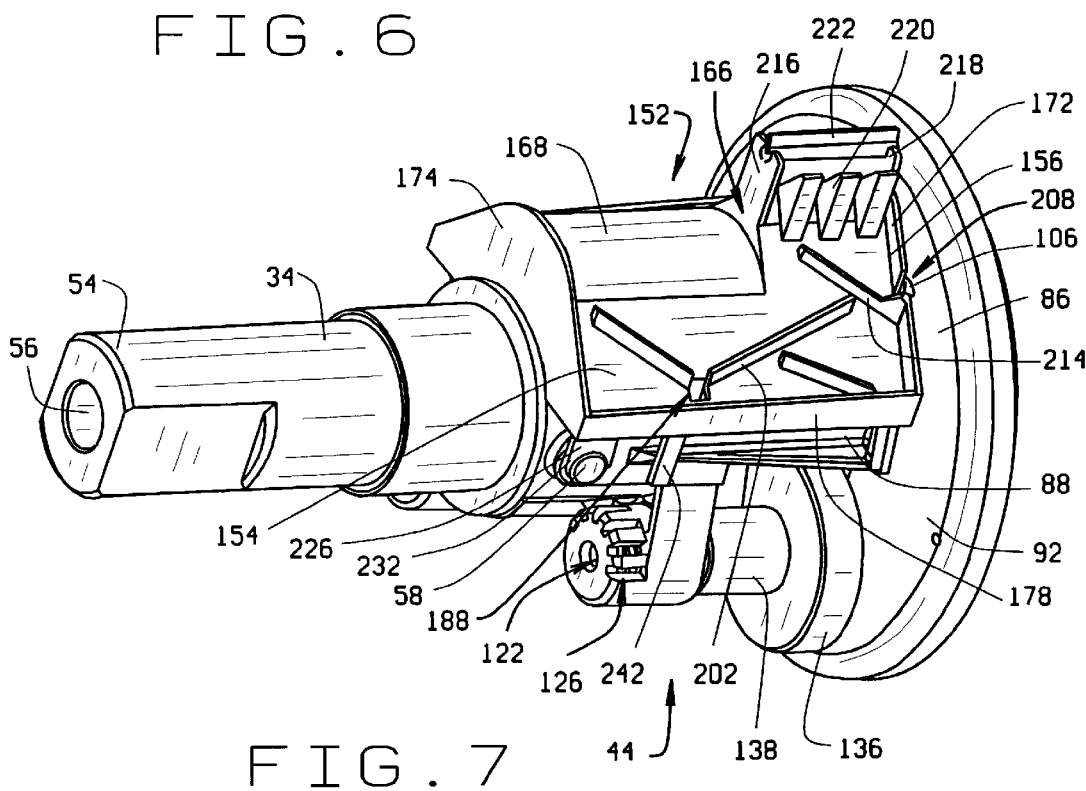
FIG. 7 is a right side perspective view of the lubricant collector and manager mounted to the motor end shield.
Figure 9:
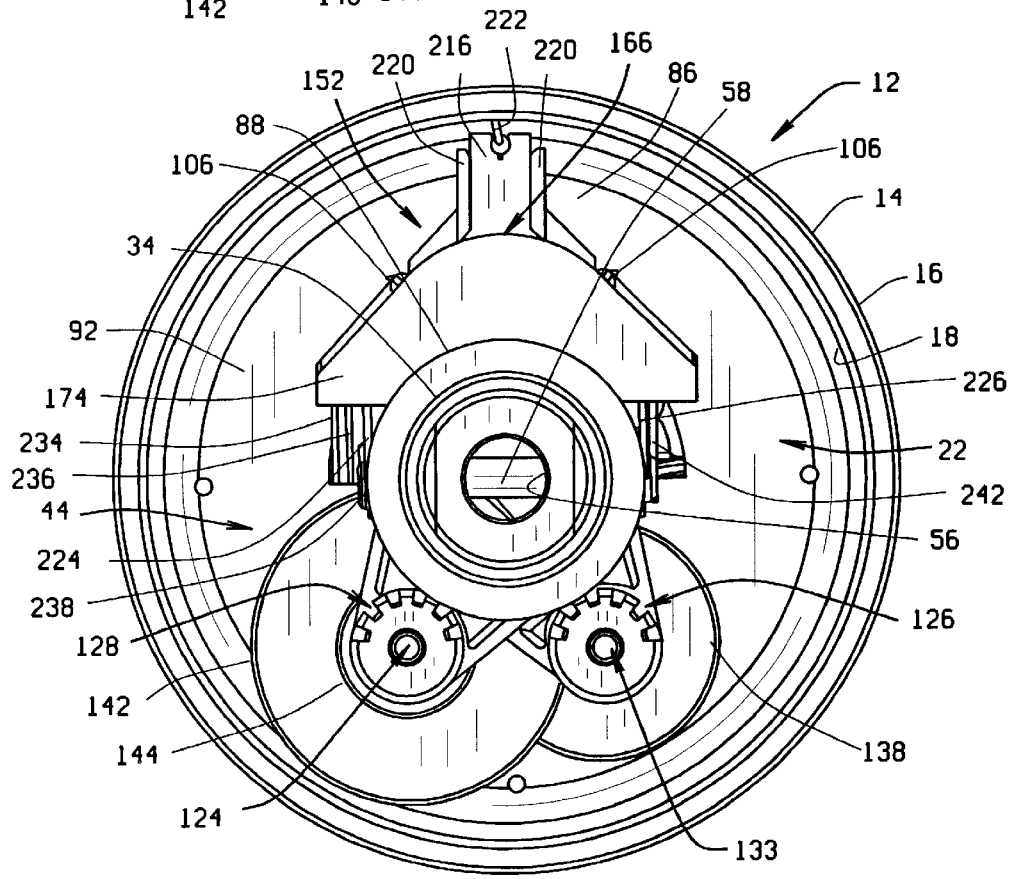
FIG. 9 is an end elevation view of the lubricant collector and manager mounted on the motor end shield of the invention with the ring gear and end plate of the motorized conveyor pulley removed.
Figure 10:
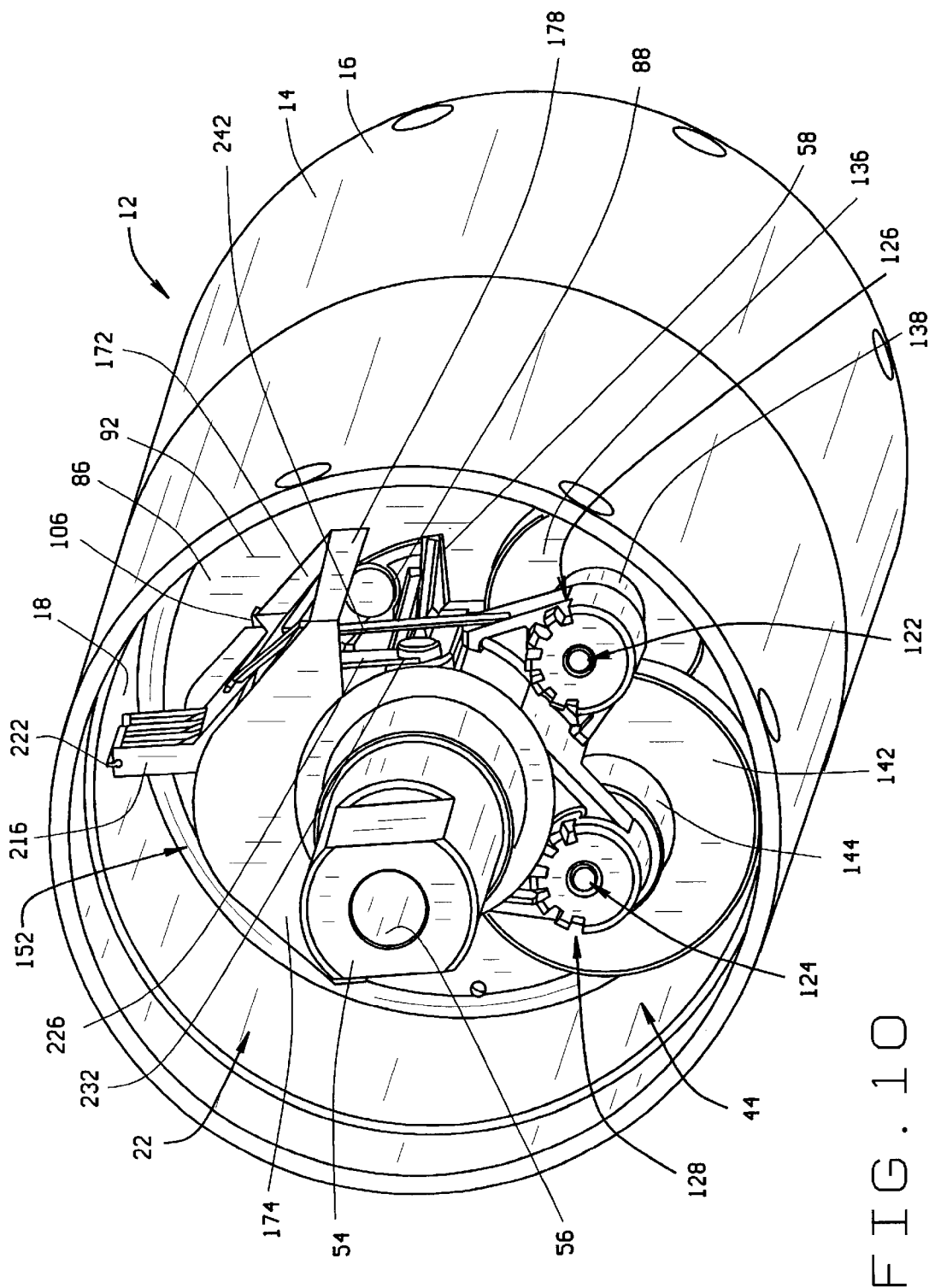
FIG. 10 is a perspective view of the end of the motorized conveyor pulley shown in FIG. 9.

The gear carrier 88 is a further improvement over prior art gear carriers in that, together with the modified end shield 86, it supports both journal ends of the gear shafts of the reduction transmission where prior art transmissions often employed cantilevered shafts or shafts supported only at their end shield ends. The particular drive transmission shown in the drawing figures is an example of only one type of transmission that may be employed with the motorized conveyor pulley of the invention. The particular transmission shown employs two pairs of gears, with each pair of gears being mounted on a common shaft. As seen in FIG. 1, the motor 42 has a drive shaft 132 with a drive gear 134 mounted on the shaft. The motor drive gear 134 meshes with a larger gear 136 of a first pair of gears mounted on a first shaft. As seen in FIGS. 7, 9 and 10, one end of the first shaft is mounted to a shaft cavity 96 of the modified end shield 86 and the opposite end is mounted to a shaft cavity 122 of the gear carrier 88. Thus, the opposite ends of the first shaft are both supported for rotation. A smaller gear 138 of the first pair of gears is also mounted on the first shaft for rotation with the large gear 136 and meshes with a larger gear 142 of a second pair of gears mounted on a second transmission shaft. The second gear shaft is also mounted for rotation at its opposite ends in one of the shaft cavities 96 in the modified end shield 86 and in one of the shaft cavities 124 of the gear carrier 88. A smaller second gear 144 is also mounted on the second gear shaft for rotation with the larger second gear 142. The smaller second gear 144 meshes with the internally threaded ring gear 146 that is secured by threaded fasteners to the interior surface 18 of the drum pulley housing 14. Thus, the construction of the gear carrier 88 of the invention, together with the modified end shield 86, support both ends of the first and second gear shafts. With the particular drive transmission shown in the drawing figures, rotation of the motor drive gear 134 imparts rotation to the larger gear 136 of the first pair which in turn rotates the small gear 138 of the first pair. Rotation of the small gear 138 of the first pair is transmitted to the larger gear 142 of the second pair of gears. The rotation of the large gear 144 of the second pair of gears also rotates the small gear 144 of the second shaft which in turn rotates the ring gear 146. Rotation of the ring gear 146 is transmitted to the pulley drum housing 14.

Figure 4:
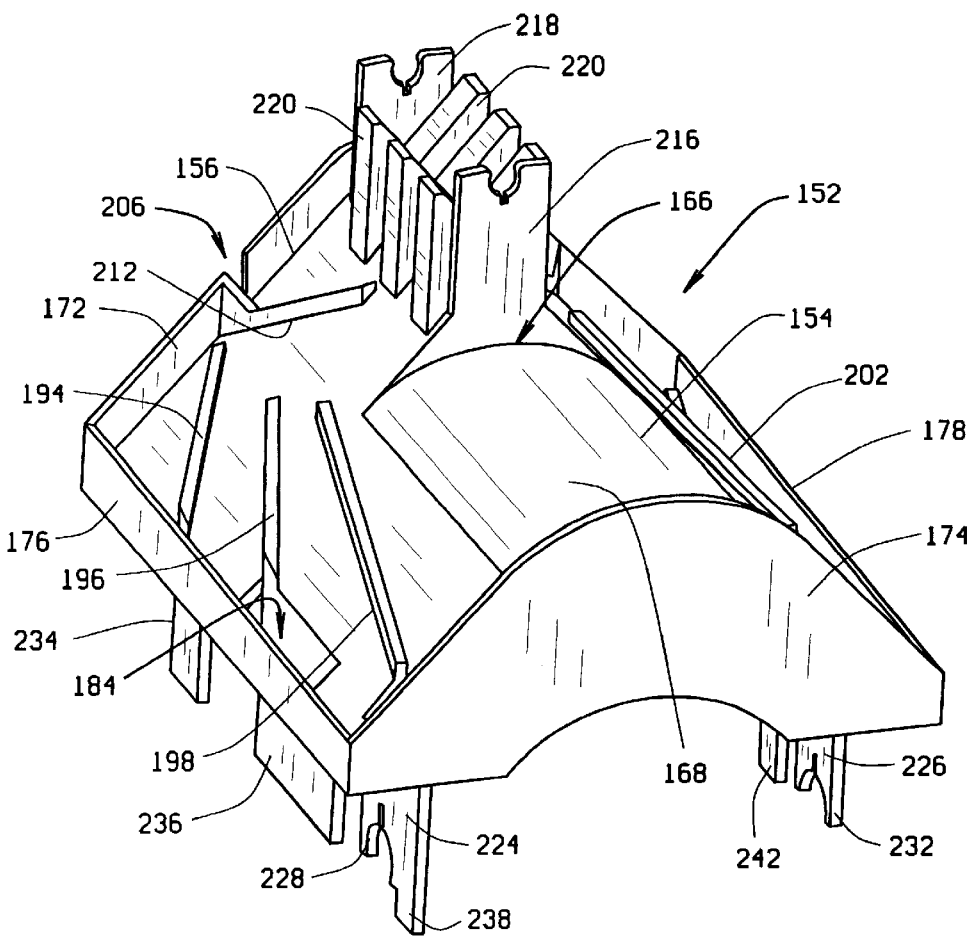
FIG. 4 is a perspective view of the passive lubrication collector and manager of the invention removed from the motorized conveyor pulley.
Figure 5:
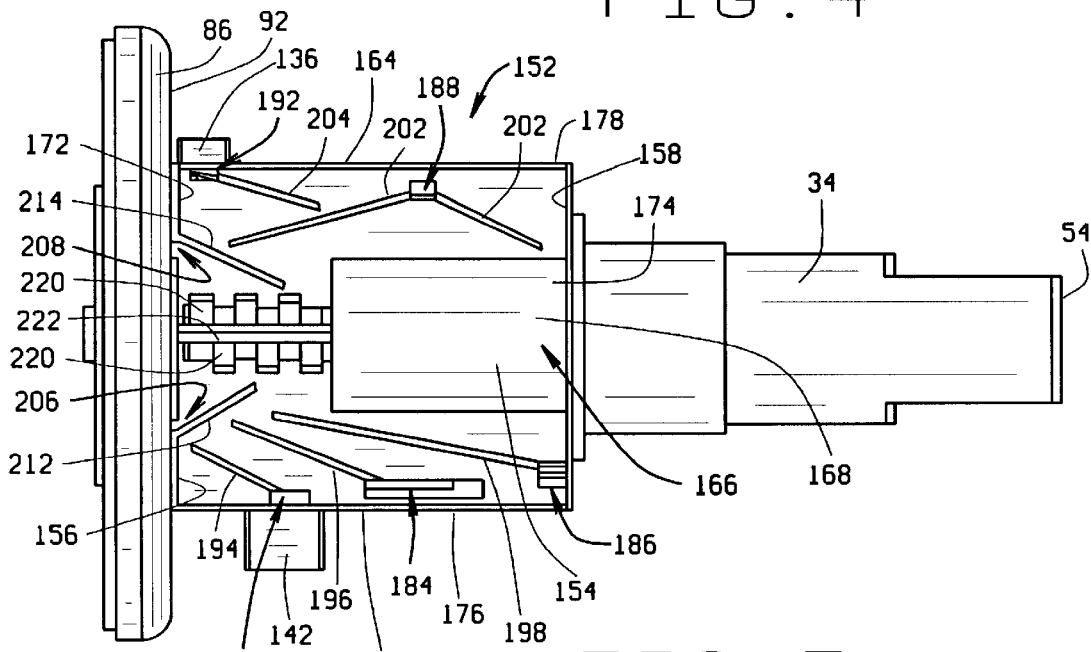
FIG. 5 is a top plain view of the lubricant collector and manager of FIG. 4.

FIG. 4 shows the lubricant collector and manager 152 of the invention removed from the motorized conveyor pulley 12. The lubricant collector and manager 152 includes a cover 154 having an inverted V-shape and opposite proximal 156 and distal 158 edges and opposite side edges 162, 164. The four edges are arranged relative to each other to give the cover a general rectangular configuration that can best be seen in the top view of the cover shown in FIG. 5. The inverted V-shape of the cover gives the cover a crest 166 extending along the top, middle of the cover with the two side edges 162, 164 being lower than the crest. The top surface 168 of the cover 154 is bounded by four walls along the four edges of the cover including a proximal wall 172, a distal wall 174, and two side walls 176, 178. The two side walls 176, 178 at the lower edges of the cover form gutters along the lower edges. Adjacent both of the side wall gutters 176, 178 are openings 182, 184, 186, 188, 192 which can best be seen in FIG. 5. These openings through the cover allow lubricant to drain through the openings and lubricate the drive transmission of the motorized conveyor pulley below the cover as will be explained. Associated with each of the openings are a series of ridges 194, 196, 198, 202, 204 that angle downwardly across the cover top surface 168 toward their respective cover openings 182, 184, 186, 188, 192. These ridges serve as guides that direct lubricant over the cover top surface 186 down to their associated cover openings by gravitation. A pair of drain openings 206, 208 are also provided through the proximal wall 172 of the cover. Associated with these drain openings are a pair of cover ridges 212, 214 that also angle downwardly as they extend across the cover top surface 168 to the proximal wall openings 206, 208.

Also on the cover top surface 168 is a pair of vertical supports 216, 218 that extend upwardly from the crest 166 of the top surface. Between the vertical supports are a plurality of upwardly projecting columns 220 that have angled top surfaces. The angled top surfaces of adjacent columns crisscross each other. The supports 216, 218 are connected to a flexible wiper 222 at their top ends. Alternatively, the wiper could be an integral part of the vertical supports and could be flexible or semirigid. As can be seen in FIGS. 6 through 10, the wiper 222 has a cylindrical base that is gripped at the top ends of the vertical supports 216, 218 and has an elongate blade that extends across the cylindrical base between the two vertical supports and the crisscrossed top surfaces of the columns 220.

The cover 154 has a pair of legs 224, 226 that extend downwardly from the cover. The legs 224, 226 are formed with pincers 228, 232 at their bottom ends that are employed in attaching the cover 154 to the motorized conveyor pulley as will be explained. Also extending downwardly from the cover are a plurality of lubricant guides in the forms of elongate bars 234, 236, 238, 242 that are associated with the cover openings 182, 184, 186, 188. The lubricant guides are positioned directly below the cover openings and direct lubricant that drains through the openings and gravitates downwardly along the lubricant guides to component parts of the drive transmission as will be explained.

Figure 6:
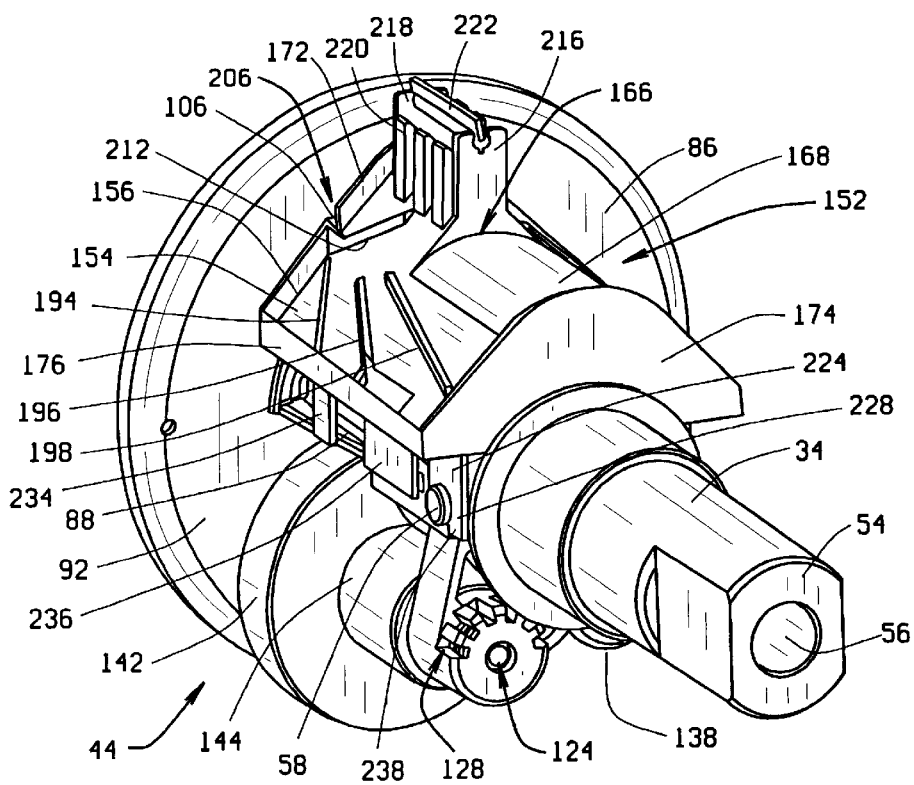
FIG. 6 is a left side perspective view of the lubricant collector and manager mounted to the motor end shield of the invention.
Figure 8:
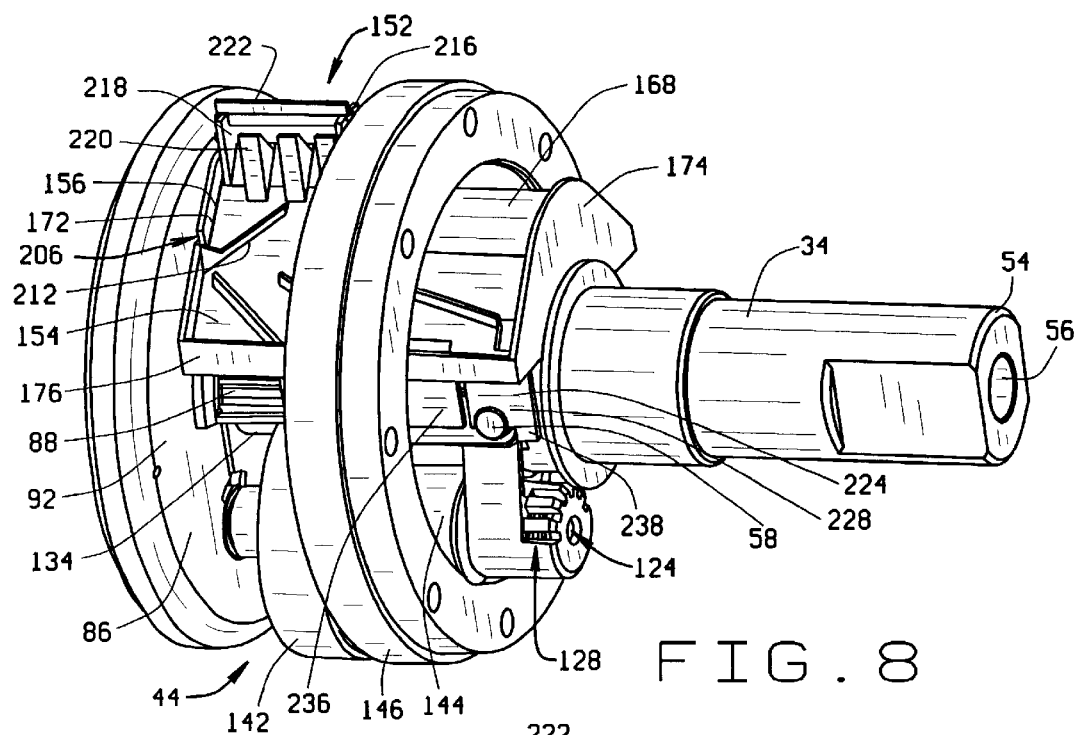
FIG. 8 is a left side perspective view similar to that of FIG. 6 but with the ring gear of the drive transmission shown.

FIGS. 6 and 7 show the cover 154 attached to the modified end shield 86 and the gear carrier 88. The cover is attached by snapping its leg pincers 228, 232 over the pin 58 that attaches the gear carrier 88 to the interior end 52 of the first stub shaft. Additional mechanical fasteners could be employed in attaching the cover to the end shield 86. FIG. 8 shows the position of the cover relative to the ring gear 146 of the drive transmission and FIGS. 9 and 10 show the position of the cover 154 relative to the pulley drum housing 14 of the motorized conveyor pulley. It can be seen in FIGS. 9 and 10 that with the cover 154 attached to the motor end shield 86, the wiper 222 is in sliding engagement with the interior surface 18 of the pulley drum housing 14 and the proximal wall openings 206, 208 open to the funnel recesses 106 of the end shield 86.

In operation of the passive lubricant collector and manager, on rotation of the pulley drum housing 14 by the electric motor 42, the wiper 222 slides across the interior surface 18 of the pulley drum housing wiping lubricant contained in the pulley drum housing from the interior surface. The lubricant wiped by the wiper 222 gravitates down the wiper onto the crisscrossed angled top surfaces of the columns 220. These surfaces distribute the gravitating lubricant to the opposite sides of the cover 154 on opposite sides of the cover crest 166. As lubricant passes downwardly over the opposite sides of the cover a portion of the lubricant is collected by the proximal wall ridges 212, 214 and is directed by the ridges to the proximal wall openings 206, 208. This lubricant is fed through the proximal wall openings to the lubricant funnel recesses 106 in the modified end shield 86. The lubricant is then directed by the inner lubricant guides or slots 108 and the outer lubricant guides or slots 104 to the shaft hole 94 and shaft cavities 96 of the end shield 86 where it lubricates the bearings (not shown) mounting the motor shaft and transmission shafts in these holes and cavities. This direct supply of lubricant to the shaft cavities 96 in the modified end shield 86 enables the use of an inexpensive sleeve bearing in the shaft cavities instead of the more expensive ball or roller bearings in prior art motor conveyor pulleys. Lubricant that gravitates downwardly over the cover top surface 168 is also gathered by the other cover ridges 194, 196, 198, 202, 204 and is directed to their associated cover openings 182, 184, 186, 188, 192. From the cover openings the lubricant is directed by the guides 234, 236, 238, 242 downwardly to the component parts of the drive transmission. The lubricant guide 234 directs lubricant to the large gear 142 of the second pair of gears which meshes with and transfers the lubricant to the small gear 138 of the first pair of gears. The guide 236 directs lubricant downwardly to the small gear 144 of the second pair of gears which meshes with and transfers lubricant to the ring gear 146. The guide 238 directs lubricant downwardly to the openings 128 of the shaft collar cavity 124 that supports a journal end of the second shaft. This direct supply of lubricant to the shaft cavity 124 enables a less expensive sleeve bearing to be used in supporting the journal end of the second shaft. The guide 242 in a like manner directs lubricant downwardly to the openings 126 of the first shaft collar cavity 122. This direct supply of lubricant to the journal end of the first shaft supported in the first shaft cavity 122 enables the use of a less expensive sleeve bearing in the shaft cavity. The lubricant received by the cover opening 192 above the large gear 136 of the first pair of gears passes through the opening and drops onto the large gear which meshes with and transfers the lubricant to the drive gear 134 of the motor. In this manner, the cover 154 distributes and supplies lubricant directly to the gears and the bearings of the drive transmission enabling the use of a lesser amount of the lubricant in the motorized conveyor pulley.

Furthermore, it can be seen in FIGS. 6 and 7 that the cover 154 completely covers the wiring opening 114 of the end shield 86 and the wiring hole 118 of the gear carrier 88. Thus, the cover 154 prevents any lubricant from dripping down onto the wiring of the electric motor and potentially leaking from the motorized conveyor pulley by leaking along the wiring out through the center bore 56 of the first stub shaft 34. Thus, the cover 154 overcomes the lubricant leakage problem of prior art motor conveyor pulleys.

The passive lubrication collector and manager described above overcomes the disadvantages of prior art motorized conveyor pulleys by reducing costs of manufacture of the motorized conveyor pulleys by enabling a lesser amount of lubricant to be contained in the conveyor pulley drum, by eliminating the problem of lubricant leakage, and by enabling less expensive sleeve bearings to be used in the drive transmission of the conveyor pulley in place of more expensive ball and roller bearings.

While the present invention has been described by reference to specific embodiment, it should be understood that modifications and variations of the invention may be constructed without departing from the scope of the invention defined in the following claims.

What is claimed is:

1. A conveyor pulley comprising:
a pulley housing having a cylindrical exterior surface and a cylindrical interior surface;
a pair of shafts at opposite ends of the pulley housing mounting the pulley housing for rotation about the pair of shafts;
a motive source operatively connected with the pulley housing for driving the pulley housing in rotation; and
a wiper in sliding engagement with the interior surface of the pulley housing and positioned relative to the motive source where the wiper will wipe lubricant from the interior surface of the pulley housing and direct the lubricant to the motive source.

2. The conveyor pulley of claim 1, wherein:
the wiper is supported in a stationary position in the pulley housing.

3. The conveyor pulley of claim 1, wherein:
the wiper is in sliding engagement with only a portion of the pulley housing interior surface.

4. The conveyor pulley of claim 1, wherein:
the motive source includes at least one shaft, the one shaft has an end supported for rotation in a stationary collar, the collar has at least one opening providing access to an interior of the collar, and the wiper is positioned relative to the collar to direct lubricant to the collar opening.

5. The conveyor pulley of claim 1, wherein:
a plurality of guides extend between the wiper and the motive source and direct lubricant from the wiper to the motive source.

6. The conveyor pulley of claim 1, wherein:
the motive source includes an electric motor and wiring of the electric motor extends through the pulley housing; and,
a cover extends over the wiring; and the wiper is mounted on the cover.

7. The conveyor pulley of claim 6, wherein:
the cover has a center crest and a pair of lower edges on opposite sides of the center crest and the pair of lower edges have gutters for collecting lubricant wiped by the wiper.

8. The conveyor pulley of claim 7, wherein:
each gutter has at least one opening for draining lubricant from the gutter and a guide is positioned adjacent the gutter opening to receive lubricant drained from the gutter and direct the lubricant away from the wiring.

9. The conveyor pulley of claim 8, wherein:
the motive source further includes at least one shaft with a journal and the guide directs lubricant to the journal.

10. The conveyor pulley of claim 9, wherein:
the journal is mounted for rotation in a collar, the collar has at least one opening and the guide directs lubricant to the collar opening.

11. The conveyor pulley of claim 10, wherein:
the motor has an end shield and a drive shaft extending through the end shield, the collar is in the end shield and the guide is a slot in the end shield.

12. The conveyor pulley of claim 9, wherein:
the guide is an elongate bar that projects from the cover.

13. A conveyor pulley comprising:
a pulley housing having a cylindrical exterior surface and a cylindrical interior surface and an interior volume surrounded by the interior surface;
a pair of shafts at opposite ends of the pulley housing supporting the pulley housing for rotation about the pair of shafts;
a motive source in the pulley housing and operatively connected with the pulley housing for driving the pulley housing in rotation; and
at least one guide positioned inside the pulley housing and above the motive source where the guide will catch lubricant gravitating off from the pulley housing interior surface as the pulley housing rotates and direct the lubricant caught to the motive source.

14. The conveyor pulley of claim 13, wherein:
the motive source includes at least one shaft, the shaft has an end supported for rotation in a stationary collar, the collar has at least one opening providing access to an interior of the collar, and the guide is positioned relative to the opening to direct lubricant to the opening.

15. The conveyor pulley of claim 14, wherein:
the motive source includes an electric motor having wiring that extends through the pulley housing; and,
a cover extends over the wiring and prevents lubricant from gravitating off from the pulley housing interior surface and onto the wiring as the pulley housing is rotated.

16. The conveyor pulley of claim 15, wherein:
the guide is on the cover.

17. The conveyor pulley of claim 15, wherein:
the cover has a center crest and a pair of lower edges on opposite sides of the crest and a pair of gutters at the cover lower edges that collect lubricant and direct lubricant to the motive source.

18. The conveyor pulley of claim 17, wherein:
each gutter has at least one opening for draining lubricant from the gutter and the guide is positioned adjacent the gutter opening to receive lubricant drained from the gutter opening and direct the lubricant to the motive source.

19. The conveyor pulley of claim 18, wherein:
the motive source further includes at least one shaft with a journal and the guide directs lubricant to the journal.

20. The conveyor pulley of claim 19, wherein:
the journal is mounted for rotation in a collar, the collar has at least one opening and the guide directs lubricant to the collar opening.

21. The conveyor pulley of claim 20, wherein:
the motor has an end shield and a drive shaft extending through the end shield, the collar is in the end shield and the guide is a slot in the end shield.

22. The conveyor pulley of claim 19, wherein:
the guide is an elongate bar that projects from the cover.

23. The conveyor pulley of claim 15, wherein:
a wiper is mounted on the cover and is in sliding engagement with the interior surface of the pulley housing and wipes lubricant from the interior surface of the pulley housing and directs the lubricant to the cover when the pulley housing is rotated.

24. A conveyor pulley comprising:

a pulley housing having a cylindrical exterior surface and a cylindrical interior surface and an interior volume surrounded by the interior surface;

a pair of shafts at opposite ends of the pulley housing supporting the pulley housing for rotation about the pair of shafts; and, a motive source in the pulley housing and operatively connected with the pulley housing for driving the pulley housing in rotation, the motive source includes at least one shaft, the shaft has an end supported for rotation in a stationary collar, and the collar has at least one opening providing access to an interior of the collar, the collar opening enabling ingress of lubricant through the collar opening and to the shaft end supported by the collar.

25. The conveyor pulley of claim 24, wherein:

the collar opening is one of a plurality of collar openings that each enable ingress of lubricant through the collar openings to the shaft end supported by the collar.

26. The conveyor pulley of claim 25, wherein:

the shaft has a center axis and the plurality of openings are spatially arranged above the center axis.

27. The conveyor pulley of claim 24, wherein:

the motive source further includes a motor in the pulley housing, the motor has an end shield and the collar is on the end shield and the collar opening is in the end shield.

28. The conveyor pulley of claim 27, wherein:

a slot is formed in the motor end shield to direct lubricant to the collar opening.

* * * * *